US010322704B2

(12) United States Patent
Nobles et al.

(10) Patent No.: US 10,322,704 B2
(45) Date of Patent: Jun. 18, 2019

(54) STABILIZER PAD FOR A WORK MACHINE

(71) Applicant: Caterpillar Inc., Peoria, IL (US)

(72) Inventors: Brian S. Nobles, Raleigh, NC (US); Daniel Baucom, Rolesville, NC (US)

(73) Assignee: Caterpillar Inc., Deerfield, IL (US)

( * ) Notice: Subject to any disclaimer, the term of this patent is extended or adjusted under 35 U.S.C. 154(b) by 0 days.

(21) Appl. No.: 15/284,784

(22) Filed: Oct. 4, 2016

(65) Prior Publication Data

US 2018/0094403 A1 Apr. 5, 2018

(51) Int. Cl.

*B60S 9/02* (2006.01)
*E02F 9/08* (2006.01)
*B60S 9/10* (2006.01)
*E06C 7/46* (2006.01)
*B60S 9/12* (2006.01)

(52) U.S. Cl.

CPC ................ *B60S 9/02* (2013.01); *E02F 9/085* (2013.01); *B60S 9/10* (2013.01); *B60S 9/12* (2013.01); *E06C 7/46* (2013.01)

(58) Field of Classification Search

CPC .... E02F 9/085; B60S 9/02; B60S 9/12; B60S 9/10; E06C 7/46
USPC ........ 248/188.8, 188.9, 633, 677; 280/763.1, 280/764.1
See application file for complete search history.

(56) References Cited

U.S. PATENT DOCUMENTS 1,973,226 A 9/1934 Rose
2,767,898 A * 10/1956 Cramer ..................... E06C 7/46 182/109
3,721,458 A 3/1973 Mitchell
3,930,668 A * 1/1976 Schuermann ........... E02F 9/085 280/763.1
4,023,828 A 5/1977 Lagsdin
4,421,290 A * 12/1983 Frank ...................... E02F 9/085 248/558
4,761,021 A 8/1988 Lagsdin
4,889,362 A 12/1989 Lagsdin
(Continued)

FOREIGN PATENT DOCUMENTS

DE 3005702 A1 8/1981
DE 3016035 A1 10/1981
(Continued)

OTHER PUBLICATIONS

Drawings associated with Part No. AT195669 (Street Pad), accessed online on Nov. 21, 2017 via https://partsadvisor.deere.com/CStoneEPC/launch.sls.

*Primary Examiner* — Eret C McNichols
(74) *Attorney, Agent, or Firm* — Miller, Matthias & Hull Bookoff McAndrews

(57) ABSTRACT

A stabilizer pad for use with stabilizer legs of a work machine is disclosed. The stabilizer pad may include a frame configured for attachment to the stabilizer leg of the work machine. The stabilizer pad may further include a first surface configured to contact a ground surface, the first surface including a resilient member, and the first surface extending a first distance from the frame in a first direction. Additionally, the stabilizer pad may include a second surface configured to contact a ground surface, the second surface including a plurality of rigid members, and the second surface extending a second distance from the frame in the first direction, the second distance being less than the first distance.

20 Claims, 6 Drawing Sheets

(56) References Cited

U.S. PATENT DOCUMENTS

| | | | | |
|---|---|---|---|---|
| 5,050,904 | A | 9/1991 | Lagsdin | |
| 5,054,812 | A | 10/1991 | Lagsdin | |
| 5,154,255 | A * | 10/1992 | Kiska | E06C 7/46 182/111 |
| 5,466,004 | A | 11/1995 | Lagsdin | |
| 5,547,220 | A | 8/1996 | Lagsdin | |
| 5,667,245 | A | 9/1997 | Lagsdin | |
| 5,957,496 | A | 9/1999 | Lagsdin | |
| 5,992,883 | A | 11/1999 | Lagsdin | |
| 6,109,650 | A | 8/2000 | Lagsdin | |
| D441,711 | S | 5/2001 | Lagsdin | |
| 6,270,119 | B1 | 8/2001 | Lagsdin | |
| 6,386,586 | B1 * | 5/2002 | Ulery, Jr. | B60S 9/02 212/301 |
| 6,422,603 | B2 | 7/2002 | Lagsdin | |
| D462,366 | S | 9/2002 | Lagsdin | |
| D462,367 | S | 9/2002 | Lagsdin | |
| 6,471,246 | B1 | 10/2002 | Lagsdin | |
| D467,594 | S | 12/2002 | Lagsdin | |
| 6,634,672 | B1 | 10/2003 | Lagsdin | |
| 6,726,246 | B2 | 4/2004 | Lagsdin | |
| 6,986,530 | B2 | 1/2006 | Lagsdin | |
| 7,040,659 | B2 | 6/2006 | Lagsdin | |
| 7,073,821 | B2 | 7/2006 | Lagsdin | |
| 7,172,216 | B1 | 2/2007 | Lagsdin | |
| 7,267,368 | B2 | 9/2007 | Lagsdin | |
| D562,355 | S | 2/2008 | Lagsdin | |
| D567,824 | S | 4/2008 | Lagsdin | |
| 7,401,812 | B2 | 4/2008 | Lagsdin | |
| 7,802,814 | B2 | 9/2010 | Lagsdin | |
| 7,900,962 | B2 | 3/2011 | Lagsdin | |
| 8,262,132 | B1 | 9/2012 | Lagsdin | |
| 2008/0185828 | A1 * | 8/2008 | Lagsdin | E02F 9/085 280/763.1 |
| 2013/0074377 | A1 | 3/2013 | Colbert | |

FOREIGN PATENT DOCUMENTS

| | | | | |
|---|---|---|---|---|
| GB | 191501236 | A * | 11/1915 | E06C 7/46 |
| JP | 5575038 | B2 | 8/2014 | |

* cited by examiner

STABILIZER PAD FOR A WORK MACHINE

TECHNICAL FIELD

The present disclosure generally relates to a stabilizer pad for a work machine and, more particularly, relates to a stabilizer pad having first and second ground contact surfaces.

BACKGROUND

Many types of mobile work machines have stabilizer legs or outriggers that extend downwardly and outwardly from opposite sides of the machine. During various digging and excavating operations executed using a work implement of the machine, the stabilizer legs engage the ground to laterally support the machine. In this manner, stabilizer legs aid in maintaining a steady and solid working foundation, as well as guarding against possible tipping of the machine. Stabilizer legs may be hydraulically operated, for example, to extend, retract, lower or raise their positions depending on the topography and/or work environment in which the machine is operating. Additionally, stabilizer legs may include stabilizer pads disposed at the distal ends of the stabilizer legs for engaging the ground surface.

Stabilizer pads have conventionally been rotationally disposed at the distal ends of stabilizer legs and included two or more sides adapted for engaging the ground surface. For example, stabilizer pads may include a first side having a rubber or other pliable material for contacting paved surfaces. The stabilizer pad may also include a second side having spikes, grousers or other rigid members for contacting dirt, gravel or other earth surfaces. During operation of the machine, such reversible stabilizer pads may be rotated so as to employ the appropriate side, depending on the ground surface on which the machine is operating. For example, when on a paved surface, the machine operator will likely position the stabilizer pads such that the rubber or pliable material contacts the ground surface rather than the rigid spikes or grousers of the alternate side, which may damage the paved surface. Likewise, when off-road on a dirt or gravel surface, for example, the machine operator will likely position the stabilizer pads such that the rigid spikes or grousers engage and dig into the ground surface thereby providing additional traction and stabilization that the rubber material alone would be incapable of providing. However, in order to switch between the different sides of these reversible stabilizer pads, operation of the machine must cease, the distal ends of the stabilizer legs having the stabilizer pads disposed thereon must be raised, and the stabilizer pads must be manually flipped to the appropriate side. This process of manually flipping the stabilizer pad is not only tedious for the machine operator or other personnel; it also decreases the overall efficiency of the operation. Therefore, a work machine that alternates during its operation between paved surfaces and off-road or earth surfaces would benefit from a stabilizer leg and pad configuration that may be employed on all surfaces without requiring the manual flipping or rotating of the stabilizer pad when moving from a paved surface to an off-road surface, or vice versa.

SUMMARY

In accordance with one aspect of the present disclosure, stabilizer pad for a work machine is disclosed which may include a frame configured for attachment to a stabilizer leg of the work machine. The disclosed stabilizer pad may further include a first surface configured to contact a ground surface. The first surface may include a resilient member, and may extend a first distance from the frame in a first direction. In addition, the stabilizer pad may include a second surface configured to contact a ground surface. The second surface may include a plurality of rigid members, and may extend a second distance from the frame in the first direction, the second distance being less than the first distance.

In accordance with another aspect of the present disclosure, a stabilizer pad for a work machine is disclosed which may include a substantially planar support plate having a first side and a second side. The stabilizer pad may also include first and second flanges extending from the support plate first side and configured for attachment to a distal end of a stabilizer leg of the work machine. The stabilizer pad may further include at least one resilient member extending in a first direction from the support plate second side and configured for contact with a paved surface. In addition, the disclosed stabilizer pad may include first and second traction walls extending in the first direction, each traction wall having a distal edge that includes a plurality of rigid members configured for contact with an earth surface.

In accordance with another aspect of the present disclosure, a resilient member configured for attachment to a stabilizer pad is disclosed. The disclosed resilient member may include a substantially planar resilient member plate. In addition, the resilient member may include a resilient material overmolded to the resilient member plate.

These and other aspects and features of the present disclosure will be better understood when read in conjunction with the accompanying drawings.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto.

DETAILED DESCRIPTION

Referring to FIGS. 1-8, a work machine 10, such as a backhoe loader, is shown that incorporates a pair of stabilizer pads 20 for a pair of stabilizer legs 24. Although the presently disclosed stabilizer pad 20 is shown in operative association with the stabilizer legs 24 of a backhoe loader, it should be understood that the presently disclosed stabilizer pad 20 may be incorporated on any suitable work machine 10. The machine 10 may be any machine that performs operations associated with an industry such as construction, farming, mining or any other industry known in the art. For example, the machine may be an earth moving machine such as a dozer, a loader, a backhoe, an excavator, a utility vehicle or any other earth moving machine, heavy machinery or mobile system.

Figure 1:
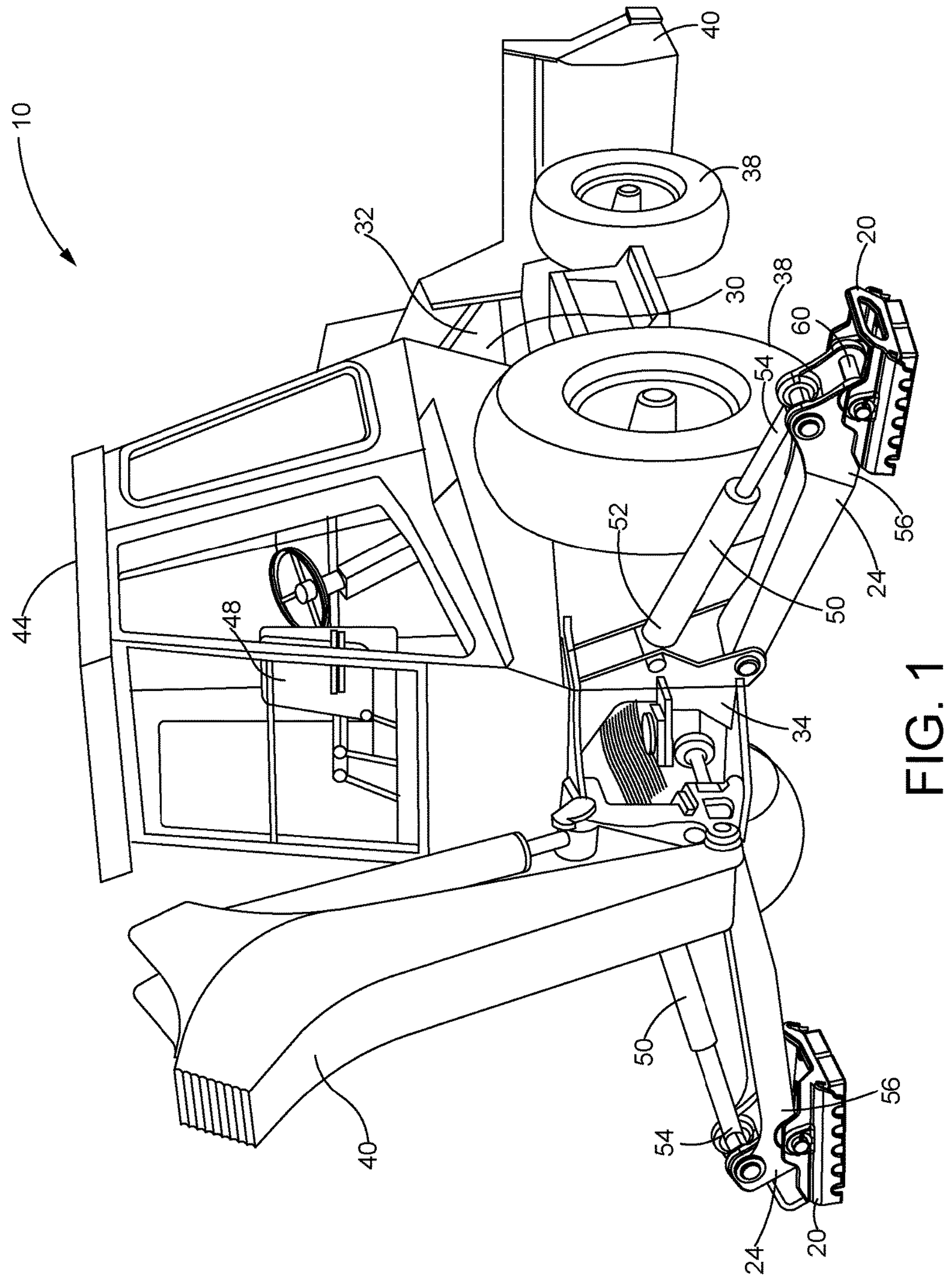
FIG. 1 is a perspective view of an exemplary work machine having stabilizer legs equipped with stabilizer pads.

With regard to FIG. 1, the work machine 10 includes a machine frame 30 with front end 32 and rear end 34 portions. The machine 10 may further include at least one traction device 38 configured to support the machine frame 30, and a power source, i.e., an engine (not shown) supported by the machine frame 30 and configured to drive the at least one traction device 38 to propel the machine 10. In addition, the machine 10 may include at least one work implement 40 supported by the machine frame 30. The implement 40 may include any work tool used for the performance of a task by the respective machine. For example, the implement may be a blade, a bucket, a shovel, a ripper, a dump bed, a propelling device or any other task-performing device known in the art. A cab 44 is mounted on the frame 30 in a well-known manner and includes a seat 48 therein for occupation by the machine operator. The seat 48 may swivel between the front end 32 and the rear end 34 directions.

Figure 7:
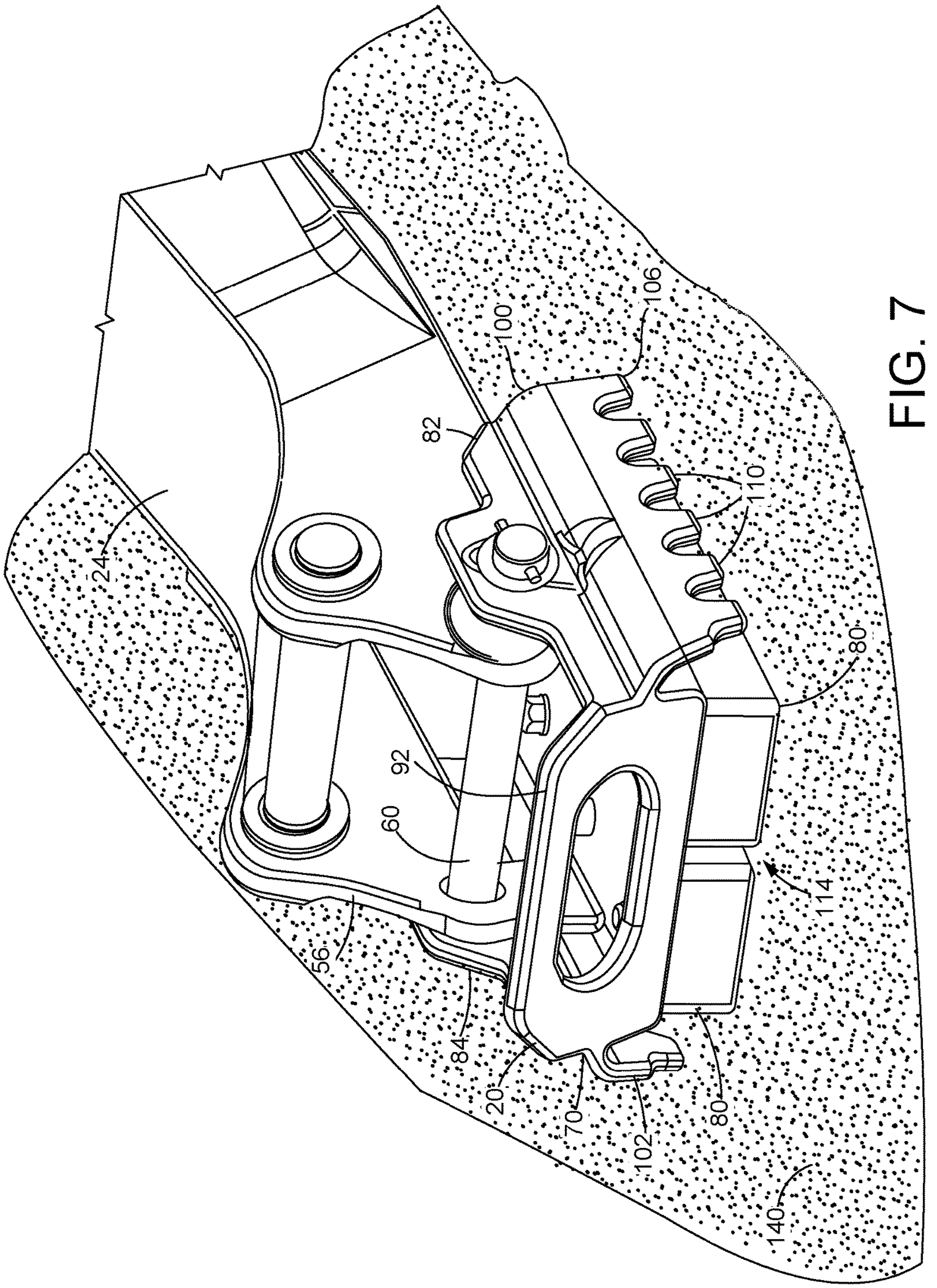
FIG. 7 is a perspective view of a stabilizer leg equipped with the exemplary stabilizer pad of FIG. 2 and positioned on a paved surface.
Figure 8:
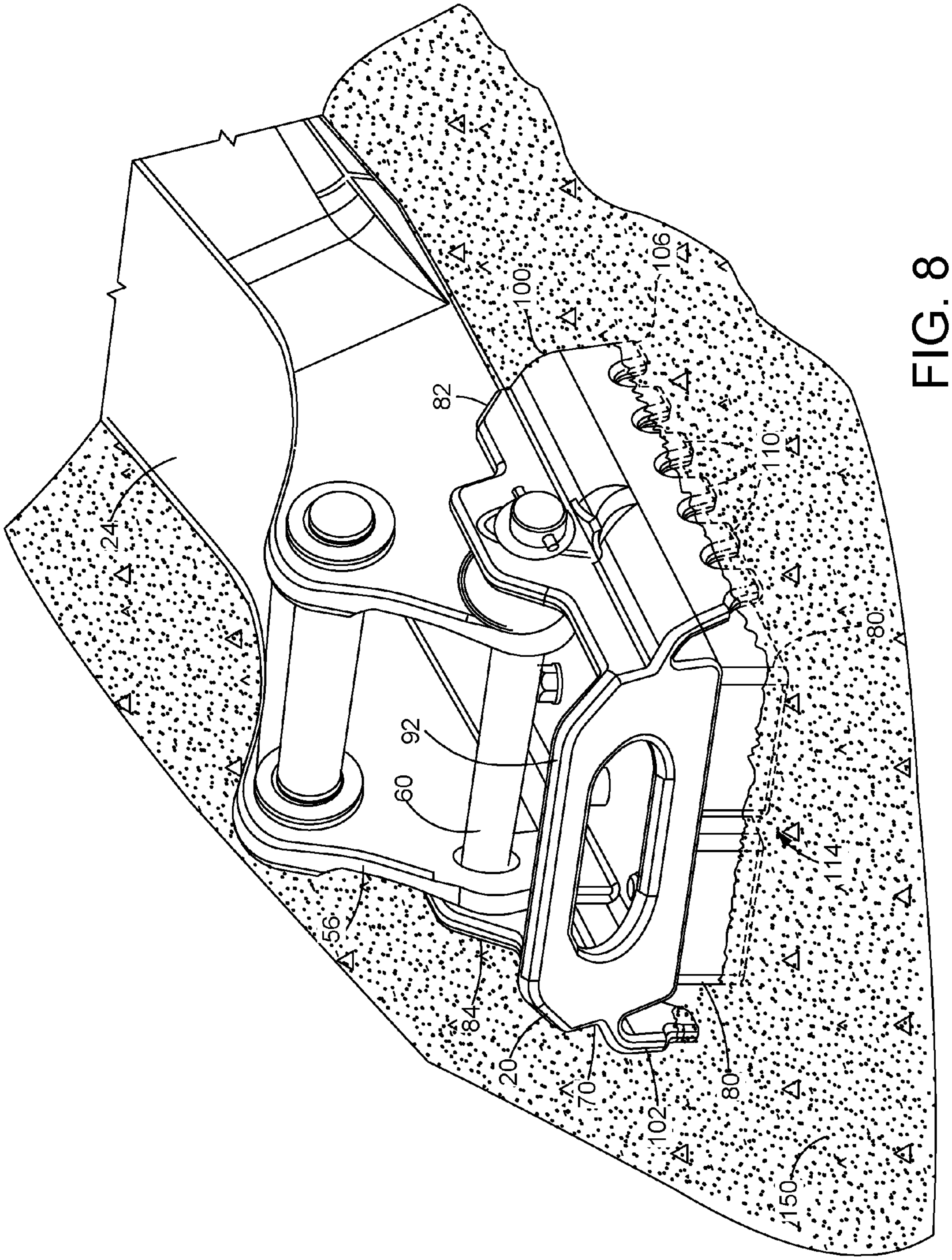
FIG. 8 is a perspective view of a stabilizer leg equipped with the exemplary stabilizer pad of FIG. 2 and positioned on an earth surface.

The pair of stabilizer legs 24 is secured on the rear end 34 portion of the frame 30 in a conventional manner During operation of the machine 10, engagement of the stabilizer legs 24 with the ground surface prevents or minimizes movement of the machine. The stabilizer legs 24 are movable between an extended (shown) and retracted position. It should be understood that the stabilizer legs 24 may be positioned at any one of a plurality of positions including raised and lowered as required during operation of the machine 10. Movement of the stabilizer legs 24 may be accomplished through a pair of hydraulic cylinders 50. Each one of the hydraulic cylinders 50 is connected in a well-known manner at a first end 52 to the frame 30 and at a second end 54 to a respective one of the pair of stabilizer legs 24. The stabilizer pad 20 may be connected in a well-known manner to a distal end 56 of the stabilizer leg 24, as shown in FIGS. 1, 7 and 8. For example, the connection between the stabilizer pad 20 and the stabilizer leg 24 may include a pin 60 that extends through the distal end 56 of the stabilizer leg 24 and also through the stabilizer pad 20. The attachment of the stabilizer pad 20 to the stabilizer leg 24 using the pin 60 allows for pivoting of the stabilizer pad 20 with respect to the stabilizer leg 24; however, any conventional retainers or fasteners known in the art may be employed to secure the stabilizer pad 20 to the stabilizer leg 24.

Figure 2:
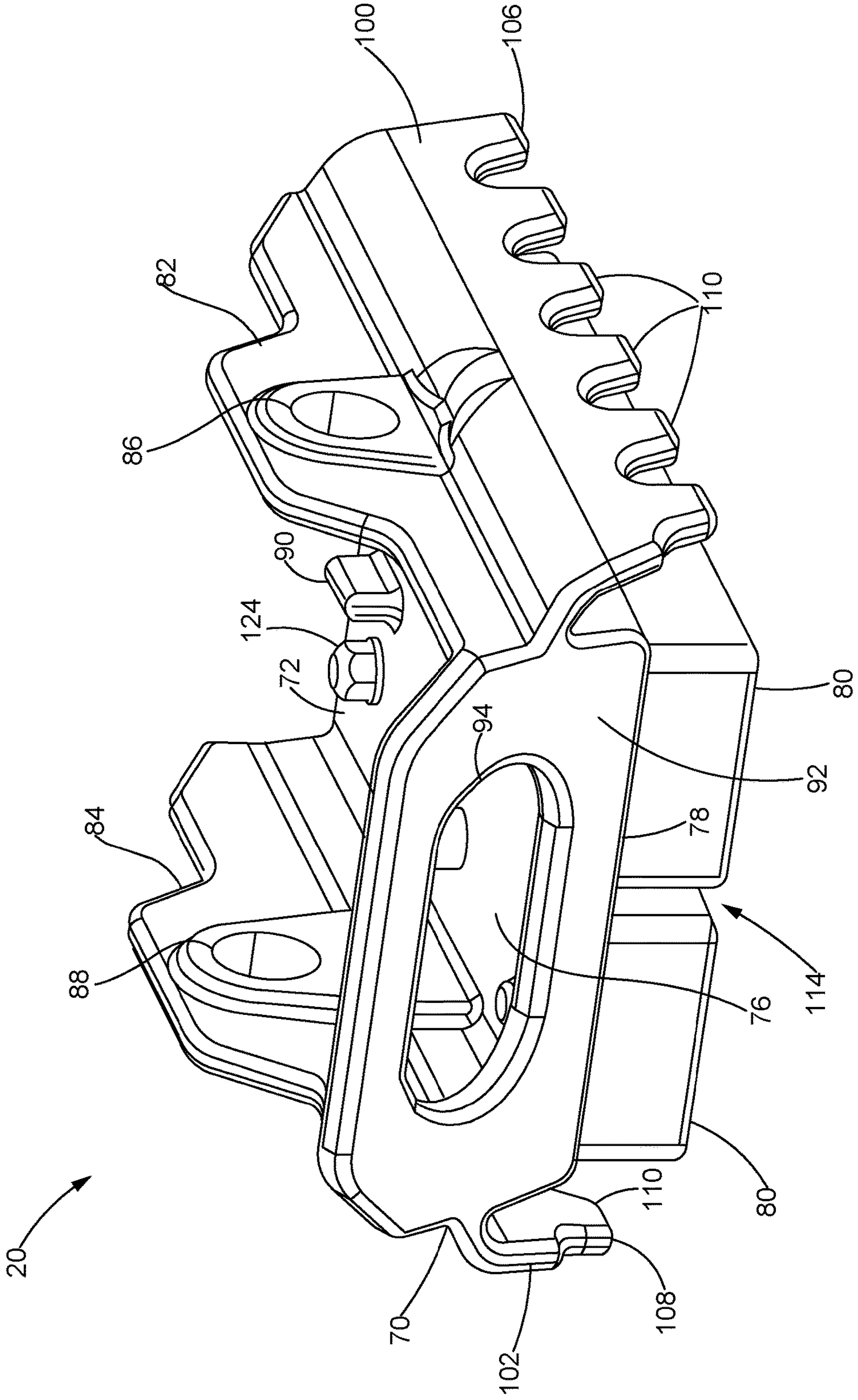
FIG. 2 is a perspective view of an exemplary stabilizer pad that may be used in conjunction with the stabilizer legs of the work machine of FIG. 1.
Figure 4:
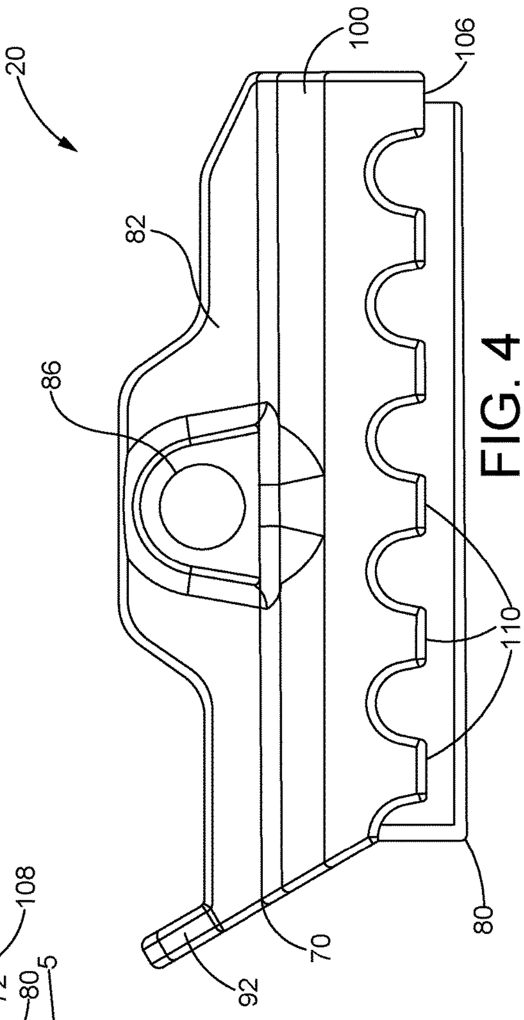
FIG. 4 is a plan view of the exemplary stabilizer pad of FIG. 2.
Figure 3:
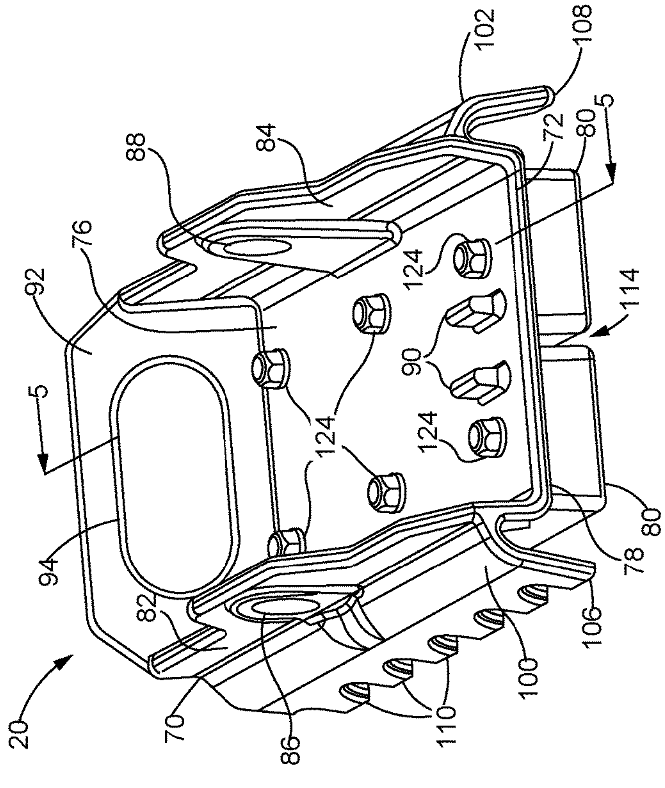
FIG. 3 is another perspective view of the exemplary stabilizer pad of FIG. 2.

Turning to FIGS. 2-4, the presently disclosed stabilizer pad 20 includes a frame 70 configured for attachment to the stabilizer leg 24. While the presently disclosed stabilizer pad 20 is illustrated as a cast steel frame, it should be understood that the frame 70 may be fabricated from independent elements welded together or otherwise joined by any manner known in the art. Likewise, the frame 70 may include burn-to-shape elements and/or may further include various elements machined into the frame surface or through the frame entirely. The frame 70 may include a substantially planar support plate 72 having a first side 76 and a second side 78. When mounted on the stabilizer leg 24, the support plate first side 76 faces the stabilizer leg 24 while the second side 78 faces the ground surface on which the machine 10 is positioned. The stabilizer pad 20 also includes resilient members 80 that extend from the support plate second side 78 in the direction of the ground surface, as described in detail below.

The stabilizer pad 20 may incorporate first and second flanges 82, 84 that extend from the first side 76 of the support plate 72. Further the first and second flanges 82, 84 may extend from opposite sides of the support plate 72 and may be configured for attachment to the distal end 56 of the stabilizer leg 24. As described above, the stabilizer pad 20 may be pivotally secured to the stabilizer leg 24 with the pin 60, which extends through the stabilizer leg 24 and the first and second flanges 82, 84 of the stabilizer pad 20 (see FIGS. 1, 7 and 8). Specifically, the first and second flanges 82, 84 may be provided with openings 86, 88 for receiving the pin 60, the openings 86, 88 aligning with corresponding openings in the stabilizer leg 24 when the pad 20 is mounted thereon. Because the stabilizer pad 20 may pivot relative to the stabilizer leg 24, the support plate first side 76, which faces the stabilizer leg 24, may be provided with stop notches 90 which function to limit the degree to which the stabilizer pad 20 may pivot. For example, should the end of the stabilizer pad 20 opposite the stop notches 90 pivot in a downward direction do to weight or otherwise, the stop notches 90 may provide a contact point with the stabilizer leg 24 thereby limiting the downward pivoting of the stabilizer pad 20. In this manner, the stabilizer pad 20 may remain relatively parallel to the ground surface before and during engagement therewith. A third flange 92 may also extend from the support plate first side 76. The third flange 92 may be disposed between the first and second flanges 82, 84, which extend from opposite sides of the support plate first side 76. The third flange 92 may include an opening 94 there through that is configured to accommodate a tie down device such as a chain or cable (not shown). Specifically, a tie down device may be used to further secure the stabilizer pad 20 to the ground surface, thereby providing additional stabilization when necessary. While not shown in the figures, it should be understood that the support plate 72 and the flanges 82, 84, 92 may include additional openings (threaded or otherwise) or fastening mechanisms configured to receive bolt-on attachments to the stabilizer pad 20. Such bolt-on attachments may be utilized so as to effectively increase the width of the stabilizer pad 20 and/or the functionality of the stabilizer pad 20.

The stabilizer pad 20 also includes first and second traction walls 100, 102 extending from opposite sides of the frame 70 in the direction of the ground surface. While both of the traction walls 100, 102 extend in the same direction as the resilient members 80, i.e., toward the ground surface, the resilient members 80 extend further from the frame 70 than the traction walls 100, 102. In this manner, the resilient members 80 function as the first ground contact surface of the stabilizer pad 20 while the traction walls 100, 102 function as the second ground contact surface of the stabilizer pad 20, as explained in detail below. The first and second traction walls 100, 102 may each include a distal edge 106, 108 that is defined by a plurality of rigid members 110. The rigid members 110 provide traction, and therefore, additional stabilization by digging into and engaging the ground surface on which the machine 10 is positioned. While the rigid members 110 are shown as grousers in FIGS. 1-4, 7 and 8, any rigid members capable of penetrating a ground surface and providing additional traction may be employed on the distal edges 106, 108 of the traction walls 100, 102, including spikes, blades, cleats, tracks, treads, grooves, etc. Additionally, the presently disclosed stabilizer pad 20 should be understood to possibly include more or less rigid members 110 than those illustrated.

The stabilizer pad 20 further includes the resilient members 80 that extend from the support plate second side 78 toward the ground surface on which the machine 10 is positioned. While the presently disclosed stabilizer pad 20 is shown as having two resilient members 80, it should be understood that any number of resilient members 80 are within the scope of this disclosure, including one or more. Where the stabilizer pad 20 is provided with more than one resilient member 80, the resilient members 80 may be arranged such that a space 114 extends partially or completely between the resilient members 80. Further, while the disclosed resilient members 80 are depicted as elongated and rectangular in shape, it should be understood that the resilient members 80 may take any alternate shape and nevertheless perform the same function. Also, rather than the illustrated solid structure, the resilient members 80 may instead be comprised of layers of pliable material secured together. As illustrated clearly in FIG. 4, the resilient members 80 extend further from the frame 70 (in the direction of a ground surface) than the traction walls 100, 102 and the rigid members 110 of the traction walls 100, 102. In this manner, the resilient members 80 may serve as the first ground contact surface of the stabilizer pad 20. The resilient members 80 are formed from a pliable material such as, but not limited to, polyurethane material, synthetic rubber, belting material, tire material and/or natural rubber. Additionally, the resilient members 80 may include a cord base material. In all cases, the resilient member material has sufficient durability, flexibility and friction providing characteristics to perform its intended function as a ground contact surface. While the ground contact surface of the resilient member 80 is depicted in the figures as flat or planar, this surface may include ridges, grooves, waves or any other surface configurations that may provide additional traction.

Figure 5:
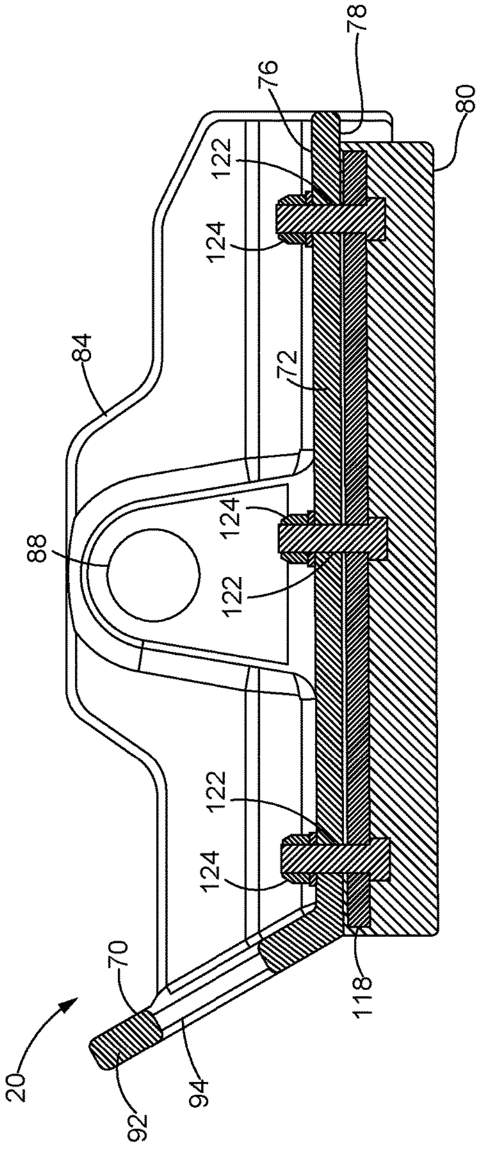
FIG. 5 is a partial cross-sectional view of the exemplary stabilizer pad as taken along line 5-5 of FIG. 3.
Figure 6:
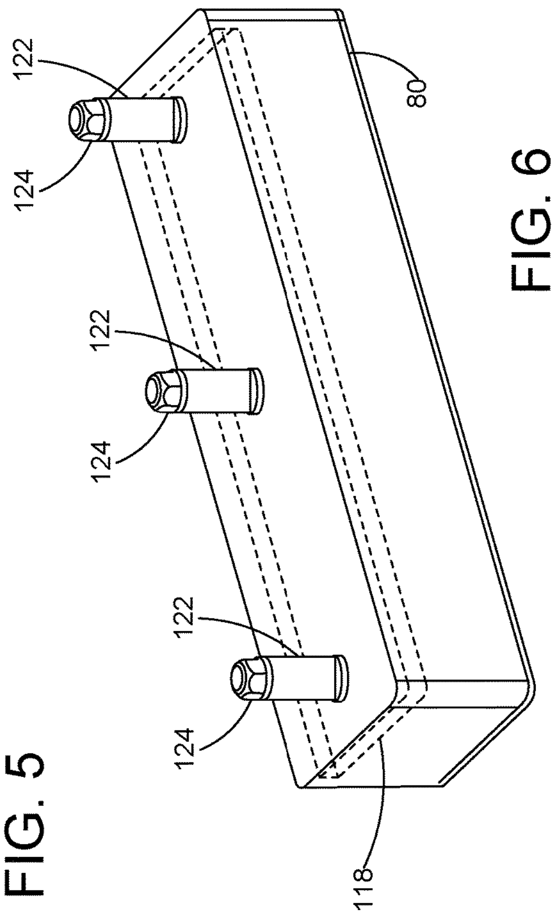
FIG. 6 is a perspective view of an exemplary resilient member that may be used in conjunction with the stabilizer pad of FIG. 2.

Referring now to FIGS. 5 and 6, the resilient members 80 may include a resilient member plate 118 that facilitates mounting of the resilient member 80 to the frame 70. The resilient member plate 118 may also contribute to the durability of the resilient member 80. FIG. 5, a partial cross-sectional view taken along line 5-5 of FIG. 3, illustrates a resilient member 80 having a resilient member plate 118 disposed within the resilient member 80. FIG. 6, a perspective view of the resilient member 80 independent of the stabilizer pad frame 70, illustrates the resilient member plate 118 within the resilient member 80 using hidden lines. The resilient member plate 118 may be a steel plate; and the pliable material of the resilient member 80 may be overmolded to the resilient member plate 118, thereby forming one resilient member unit. Fasteners such as bolts 122 may also extend through and out of the resilient member 80. Any number of bolts 122 may be used. Such bolts 122 may traverse the resilient member plate 118 and ultimately be received in holes spanning the support plate 72 of the stabilizer pad frame 70, thereby facilitating attachment of the resilient member 80 to the frame 70. Specifically, nuts 124 disposed at the first side 76 of the support plate 72 on the distal ends of the bolts 122 may secure the resilient member 80 to the support plate 72. Any fastener known in the art may be employed for attaching the resilient member 80 to the frame 70, including, but not limited to, screws, anchors, nails, clips, pins, staples, etc. Such fasteners may be secured to the resilient member plate 118 before the overmolding of the pliable material thereto. Such a configuration may allow for an independent resilient member 80 to be readily dismounted from or mounted to the stabilizer pad frame 70. Likewise, a worn or damaged resilient member 80 may be easily replaced with a new resilient member 80. Specifically, replacement of a worn resilient member simply requires removal of the nuts 124, sliding out of the bolts 122 from the support plate 72 and removal of the worn resilient member 80, and mounting of a new, replacement resilient member 80.

INDUSTRIAL APPLICABILITY

The disclosed stabilizer pad may be integrated with stabilizer legs of many mobile work machines including, but not limited to, earth-moving equipment, mining machines and other construction or agriculture machinery. For example, the stabilizer pad could be used in combination with stabilizer legs of backhoes, miners, tractors, dozers, excavators, articulated trucks, haul trucks, generator sets, etc. By incorporating the stabilizer pad 20 of the present disclosure, the stabilizer legs 24 of the work machine 10 are afforded different stabilizer pad contact surfaces for different ground surfaces, each readily available for exploitation without the extra obligation of flipping the stabilizer pad. Further, where the stabilizer pad 20 is employed, used or damaged resilient members 80 may easily be replaced with new resilient members 80 that are adapted for mounting onto the stabilizer pad frame 70.

FIGS. 7 and 8 demonstrate the improved stabilizer pad 20 in operation on different ground surfaces. As well known in the industry, mobile work machines 10 may frequently alternate between work on paved surfaces, such as asphalt, concrete, etc., and work on earth surfaces, such as dirt, gravel, sand, soil, etc. Stabilizer pad contact surfaces such as rubber pads may be appropriate for paved surfaces while a contact surface such as spikes or grousers may be required for earth surfaces. The use of spikes or other rigid members on paved surfaces is discouraged because of the potential for damage that could be inflicted on the paved surface. As described above, conventional stabilizer pads are rotatable and include different sides having different contact surfaces. When using such conventional pads, the machine operator or other personnel is required to flip the stabilizer pad when moving between different ground surfaces so as to position the appropriate side or contact surface of the stabilizer pad toward the specific ground surface on which the machine is then positioned. As illustrated in FIGS. 7 and 8, the improved stabilizer pad 20 avoids the inefficiency of having to stop operation of the machine 10, raise the stabilizer pad from the ground surface and manually flip the pad. Instead, the stabilizer pad 20 is adapted for use on both paved surfaces and earth surfaces without flipping or rotating the stabilizer pad 20.

Specifically, as seen in FIG. 7, when the machine 10 is positioned for work on a paved surface 140, for example, asphalt, the resilient members 80 that extend from the pad frame 70 toward the surface 140 serve as the contact surface between the stabilizer pad 20 and the surface 140. These resilient members 80, being of a pliable material, will not damage the surface 140. The traction walls 100, 102 of the stabilizer pad 20 also extend from the frame 70 toward the surface 140; however, as described above and illustrated in the figures, the resilient members 80 extend further from the frame 70 than the distal edges 106, 108 of the traction walls 100, 102, as well as the rigid members 110 thereof. This configuration assures that the resilient members 80 serve as the first contact surface between the stabilizer pad 20 and any ground surface. Moreover, the resilient members 80 are of sufficient durability and compressibility that even under excessive pressure, the rigid members 110 of the traction walls 100, 102 will remain elevated from the relatively flat paved surface 140.

Alternatively, as seen in FIG. 8, when the machine 10 is positioned for work on an earth surface 150, for example, gravel, both the resilient members 80 and the rigid members 110 of the traction walls 100, 102 may serve as contact surfaces between the stabilizer pad 20 and the surface 150. To begin with, when the stabilizer pad 20 is positioned on the surface 150, the resilient members 80, extending further from the frame 70 than the rigid members 110, make first contact with the surface 150, thereby providing some initial stabilization. However, given the nature of the earth surface 150, perhaps comprising loose gravel, soft dirt or sand, additional traction between the surface 150 and the stabilizer pad 20 may be required for sufficient stabilization. The rigid members 110 provide this additional required traction by digging into the surface 150 after compression of the resilient members 80 and submerging of the resilient members 80 into the surface 150, as illustrated using hidden lines in FIG. 8. Specifically, when the stabilizer pad 20 is placed on the earth surface 150, and possibly with slight shifting of the stabilizer leg 24 and the pad 20 during operation of the machine 10, the resilient members 80 not only compress to some degree under the pressure and weight exerted thereon, but the resilient members 80 may also sink into the surface 150, thereby bringing the rigid members 110 closer to and ultimately into the surface 150. This digging of the rigid members 110 into the earth surface 150 provides additional traction between the stabilizer pad 20 and the surface 150, thereby providing additional stabilization. In this manner, the resilient members 80 serve as the first contact surface of the stabilizer pad 20 and the rigid members 110 serve as the second contact surface of the stabilizer pad 20.

As noted above, the stabilizer pad 20 may comprise one or more resilient members 80. Where more than one resilient member 80 is utilized, the space 114 that exists between the resilient members 80 may facilitate the sinking of the resilient members 80 into the earth surface 150, thereby hastening the digging of the rigid members 110 into the earth surface 150, as well as the secondary stabilization associated with this additional traction. Because the disclosed stabilizer pads 20 may be utilized on machines positioned on both paved or earth surfaces, as well as machines alternating frequently between different surfaces, the overall efficiency of the work operation is improved. Specifically, when employing the improved stabilizer pads 20, as compared to conventional stabilizer pads, it is not required that the operator cease working, raise the stabilizer legs and manually flip the stabilizer pads when moving between different work surfaces.

As also described above and illustrated most clearly in FIGS. 5 and 6, the resilient member 80 includes a resilient material overmolded to the resilient member plate 118. Fasteners, such as bolts 122, may extend out of the resilient member 80 and may ultimately be received by and secured to the frame 70 of the stabilizer pad 20. While the disclosed resilient members 80 are more sturdy and durable due to the presence of the resilient member plate 118 disposed therein, the resilient members 80 may become worn or damaged after extended use. When required, a worn resilient member 80 may be easily replaced onsite or otherwise with a new resilient member 80 equipped with the necessary fastener(s) for mounting to the stabilizer pad frame 70. The disclosed resilient member 80 therefore further adds to the already improved efficiency provided by employing the disclosed stabilizer pads 20. Moreover, because the stabilizer pad 20 may be easily renewed or repaired by replacing the resilient members 80, the overall operating cost of the machine 10 may be lowered. Specifically, the stabilizer pad frame 70 may be renewed and reused, thereby reducing the number of replacement parts and service required.

All references to the disclosure or examples thereof are intended to reference the particular example being discussed at that point and are not intended to imply any limitation as to the scope of the disclosure more generally. Also, it will be apparent to those skilled in the art that various modifications and variations can be made to the stabilizer pads of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A stabilizer pad for a work machine, the stabilizer pad comprising:

a frame configured for attachment to a stabilizer leg of the work machine;

a first surface configured to contact a ground surface, the first surface including a resilient member having a resilient material overmolded to a resilient member plate such that the resilient member plate is entirely contained within the resilient material, the resilient member being attached to the frame by a fastener that extends in a first direction and is partially embedded within the resilient material and traverses the resilient member plate and the frame, and the first surface extending a first distance from the frame in the first direction; and a second surface configured to contact and engage the ground surface when the resilient member is at least partially compressed, the second surface including a first plurality of rigid members extending toward the ground surface and positioned on a first side of the resilient member and a second plurality of rigid members extending toward the ground surface and positioned on a second side of the resilient member opposite to the first side, and wherein the second surface extends a second distance from the frame in the first direction, the second distance being less than the first distance, wherein the frame includes a support plate that extends substantially parallel to the resilient member plate, wherein the first and second pluralities of rigid members extend from respective traction walls, and wherein each of the traction walls includes an upper curved portion that is coupled to and extends away from the support plate of the frame, and wherein each of the traction walls includes a lower planar portion that extends away from the upper curved portion of the respective traction wall such that the pluralities of rigid members extend laterally beyond the resilient member to form a vertically-extending gap between the resilient member and the pluralities of rigid members.

2. The stabilizer pad of claim 1, wherein the first surface comprises a plurality of resilient members, and wherein each resilient member of the plurality of resilient members is replaceable.

3. The stabilizer pad of claim 1, wherein each of the first plurality of rigid members and the second plurality of rigid members are selected from a group consisting of grousers, spikes, blades, cleats, tracks, treads, grooves and traction providing members.

4. The stabilizer pad of claim 1, wherein the resilient member defines a ground-contacting surface and an upper surface opposite therefrom, and the fastener extends through the upper surface.

5. The stabilizer pad of claim 1, further including:

first and second flanges extending from first and second edges of a first side of the support plate and configured for attachment to a distal end of a stabilizer leg of the work machine such that the distal end of the stabilizer leg is spaced away from the first side of the support when attached to the stabilizer leg; and a third flange extending from the first side of the support plate and positioned on a third edge of the first side of the support plate, wherein the third edge of the first side of the support plate is perpendicular to both the first edge and the second edge, wherein the third flange includes an opening therethrough, and wherein a fourth edge of the first side of the frame is free from a flange extending therefrom.

6. A stabilizer pad for a work machine, the stabilizer pad comprising:

a substantially planar support plate having a first side and a second side;

first and second flanges extending from opposite edges of the support plate first side and configured for attachment to a distal end of a stabilizer leg of the work machine such that the distal end of the stabilizer leg is spaced away from the first side of the support plate when attached to the stabilizer leg;

at least one resilient member extending in a first direction from the support plate second side and configured for contact with a paved surface, the resilient member including a resilient material overmolded to a resilient member plate such that the resilient member plate is entirely surrounded by the resilient material, and wherein the resilient member is attached to the support plate by a fastener that extends in the first direction through a segment of the resilient material and traverses the resilient member plate and the support plate;

first and second traction walls extending in the first direction, each traction wall having a distal edge that includes a plurality of rigid members configured for contact with an earth surface, wherein the first traction wall is coupled to the support plate via a first curved portion, and wherein the second traction wall is coupled to the support plate via a second curved portion; and a third flange that extends from the support plate first side, the third flange including an opening there through, wherein the third flange is positioned on a third edge of the first side perpendicular to the first and second flanges, and wherein a fourth edge of the first side of the support plate is free from a flange extending therefrom.

7. The stabilizer pad of claim 6, further comprising a plurality of resilient members.

8. The stabilizer pad of claim 6, wherein the resilient member is replaceable.

9. The stabilizer pad of claim 6, wherein the resilient member comprises polyurethane.

10. The stabilizer pad of claim 6, wherein the plurality of rigid members comprises grousers.

11. The stabilizer pad of claim 6, wherein the resilient member is at least partially disposed below the distal edges of the traction walls.

12. The stabilizer pad of claim 6, wherein the rigid members are configured for contact with the earth surface only after at least partial compression of the resilient member.

13. The stabilizer pad of claim 6, wherein the first and second flanges are further configured to receive bolt on attachments.

14. The stabilizer pad of claim 6, wherein the resilient member includes an upper surface in facing relationship with the support plate second side, and the fastener extends through the upper surface.

15. The stabilizer pad of claim 6, wherein the first traction wall includes a first straight portion that extends from the first curved portion to the plurality of rigid members, wherein the second traction wall includes a second straight portion that extends from the second curved portion to the plurality of rigid members, and wherein the first and second straight portions are spaced away from the at least one resilient member by first and second gaps.

16. A stabilizer pad for a work machine, the stabilizer pad comprising:

a frame;

a resilient member including:

a substantially planar resilient member plate; and a resilient material overmolded to the resilient member plate such that the resilient member plate is positioned within the resilient material, a fastener adapted to attach the resilient member to the frame of the stabilizer pad, the fastener extending between a first end and a second end and traversing the resilient member plate, the first end being positioned within the resilient material and the resilient member plate being positioned between the first end and the second end;

at least one traction wall, wherein the at least one traction wall includes an upper curved portion and a lower planar portion, wherein the upper curved portion is coupled to the frame and extends away from a side of the frame, wherein the lower planar portion extends at an angle away from the upper curved portion in a same direction as the resilient member to form a vertically-extending gap between the resilient member and the lower planar portion, and wherein the at least one traction wall includes a plurality of rigid members configured to engage a ground surface when the resilient member has been at least partially compressed;

first and second flanges extending from first and second edges of a first side of the frame and configured for attachment to a distal end of a stabilizer leg of the work machine such that the distal end of the stabilizer leg is spaced away from the first side of the frame when attached to the stabilizer leg; and a third flange extending from the first side of the frame and positioned on a third edge of the first side of the frame, wherein the third flange includes an opening therethrough.

17. The stabilizer pad of claim 16, wherein the fastener comprises at least one bolt having a head and a shank, the head being the first end and the shank extending through the resilient member plate and out past the resilient material.

18. The stabilizer pad of claim 16, wherein the resilient material comprises polyurethane.

19. The stabilizer pad of claim 16, wherein the resilient material defines a ground-contacting surface and an upper surface opposite therefrom, and the fastener extends through the upper surface.

20. The stabilizer pad of claim 16, wherein the third edge of the first side of the frame is perpendicular to both the first edge and the second edge, and wherein a fourth edge of the first side of the frame is free from a flange extending therefrom.

* * * * *